(12) United States Patent
Tzeng et al.

(10) Patent No.: US 6,959,323 B1
(45) Date of Patent: Oct. 25, 2005

(54) SCALABLE ATOMIC MULTICAST

(75) Inventors: Hong-Yi Tzeng, Tinton Falls, NJ (US); Yin Zhang, Berkeley, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/384,699

(22) Filed: Aug. 27, 1999

Related U.S. Application Data

(60) Provisional application No. 60/098,065, filed on Aug. 27, 1998.

(51) Int. Cl.[7] .................... G06F 15/16; G06F 15/173
(52) U.S. Cl. .................... 709/205; 709/244; 709/245
(58) Field of Search .................... 713/163; 714/748; 709/205, 244–245

(56) References Cited

U.S. PATENT DOCUMENTS

| | | | | |
|---|---|---|---|---|
| 4,807,224 A | * | 2/1989 | Naron et al. | 370/218 |
| 5,036,518 A | * | 7/1991 | Tseung | 714/748 |
| 5,216,675 A | * | 6/1993 | Melliar-Smith et al. | 714/748 |
| 5,319,773 A | * | 6/1994 | Britton et al. | 714/15 |
| 5,541,927 A | * | 7/1996 | Kristol et al. | 370/408 |
| 5,742,812 A | * | 4/1998 | Baylor et al. | 707/8 |
| 5,778,187 A | * | 7/1998 | Monteiro et al. | 709/231 |
| 5,781,910 A | * | 7/1998 | Gostanian et al. | 707/201 |
| 5,805,785 A | * | 9/1998 | Dias et al. | 714/4 |
| 5,916,307 A | * | 6/1999 | Piskiel et al. | 719/314 |
| 6,031,818 A | * | 2/2000 | Lo et al. | 370/216 |
| 6,105,147 A | * | 8/2000 | Molloy | 714/16 |

OTHER PUBLICATIONS

Floyd, et al. "A Reliable Multicast Framework for Lightweight Sessions and Application Level Framing", IEEE/ACM Transactio on Networking, Dec. 1997.*

Parnes. "Scalable Reliable Multicast—SRM", <http://www.cdt.luth/se/~peppar/docs/lic/html/node67.html>, retrieved Feb. 3, 2003, posted Sep. 8, 1997.*

Guerraoui, et al. "Scalable Atomic Multicast", Swiss Federal Institute of Technology Computer Sciene Department, Jan. 1998, 8 pages.*

(Continued)

*Primary Examiner*—David Wiley
*Assistant Examiner*—George Neurauter, Jr.

(57) ABSTRACT

This document describes a protocol for reliably synchronizing states of nodes in a distributed environment through use of a Scalable Atomic Multicast (SAM) Service that ensures both atomicity and total order among messages sent to a multicast group. In addition to possessing good scalability property, this fault-tolerant protocol does not require explicit knowledge of multicast group membership, allows for non-disturbing state synchronization, and supports asynchronous non-blocking communications. According to one aspect of this invention, a dedicated sequencer is responsible solely for assigning sequence numbers to the multicast messages. The sequencer does not multicast the messages. Another aspect of the invention is the use of receiver-driven negative acknowledgments. According to third aspect, the invention supports message consolidation and garbage collection.

28 Claims, 3 Drawing Sheets

SENDING A DATA PACKET IN SAM (1) DATA
(2) DATA REPORT
(5) COMMIT
(3) COMMIT SUBMIT
(5) COMMIT ACK

OTHER PUBLICATIONS

Zuberi, et al. "A Casual Message Ordering Scheme for Distributed Embedded Real-Time Systems", Reliable Distributed Systems, Proceedings, 15th Symposium, Oct. 23-25, 1996, pp. 210-219.*

Hiltunen, et al. "An Approach to Constructing Modular Fault-Tolerant Protocols", Reliable Distributed Systems, Proceedings, 12th Symposium, Oct. 6-8, 1993, pp. 104-114.*

Luis Rodrigues, et al, "*Totally Ordered Mutlicast in Large-Scale Systems*," IEEE 16th Intl'. Conf. Distributed Sys. 1996.

Renesse, et al, Horus: "*A Flexible Group Communications System*," Comm. of ACM, Apr. 1996.

Birman, et al, "*Lightweigh Casual and Atomic Group Multicast*," ACM Transactions on Computer Systems, Aug. 1991.

Moser, et al, "*Extended Virtual Synchrony*," IEEE 14th (Jun. 1994) International Conf. Distributed Computing Systems, Comm. ACM.

Chandra & Toueg, "*Unreliable Failure Detectors for Reliable Distributed Systems*," Journal of ACM, Mar. 1996.

Amir, et al, "*The Totem Single-Ring Ordering and Membership Protocol*," ACM Transactions on Computer Sys., Nov. 1995.

* cited by examiner

BASIC COMPONENTS IN SAM

- CLIENT: A PROCESS THAT HAS DATA PACKETS TO SEND.

- SEQUENCER: SERIALIZE DATA PACKETS SENT TO THE GROUP.

- COMMIT SERVER: STORE THE ORDERING INFORMATION FOR EACH DATA PACKET.

- DATA SERVER: STORE DATA PACKETS.

- CHECKPOINT SERVER:
  -DO MESSAGE CONSOLIDATION.

NOTE:  LOGICAL CONCEPT ONLY.

ASSUMPTIONS: UNIQUE PROCESS ID
UNIQUE DATA PACKET ID (E.G. PROCESS ID + SEQ)

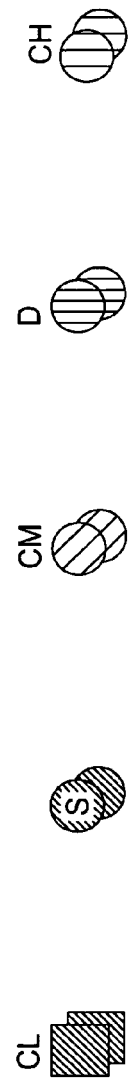

FIG. 1A

SCALABLE ATOMIC MULTICAST

CROSS REFERENCE TO RELATED APPLICATION

This application claims the priority benefits of U.S. Provisional Application No. 60/098,065, filed on Aug. 27, 1998.

TECHNICAL FIELD

This invention relates to communication protocols for distributed networks requiring state synchronization between nodes.

BACKGROUND OF THE INVENTION

Many networking applications involve large numbers of end-points, i.e., nodes. Such applications may require their components to synchronize states reliably in a highly distributed environment. Well known examples of the problem include enforcing consistency in a distributed database and maintaining cache coherency in a distributed multiprocessor environment. Although the problem has existed for a long time, recent exponential growth of Internet and proliferation of Internet-related applications bring it to the foreground and underscore the need for more efficient solutions. Moreover, Internet-related applications can be distributed over thousands of end-points and often operate in real time, complicating straightforward extension of previously known methods. As one illustration, let us take a brief look at the architecture of a network router.

A typical router has a single router controller managing multiple forwarding devices. A single router can easily cause performance bottlenecks; it is also a single point of failure. High performance routers of the next generation will likely include multiple router controllers working in parallel. In such an architecture, consistency must be maintained over all router controllers' forwarding tables. This is a classical state synchronization requirement.

Such synchronization requirement can be naturally supported by an atomic multicast service, which ensures both atomicity and total ordering over all messages sent to the multicast group. By atomicity we mean that any message sent to the group is delivered either to all or none of the operational group members. Total ordering means that messages are delivered in the same order at all such group members: Note that here we use delivered rather than received. By delivered we mean that a message is passed to applications sitting on top of the atomic multicast service. The order in which messages get delivered can be different from the order in which they are received.

As a fundamental abstraction for building distributed reliable applications, atomic multicast has been widely studied in the field, and has been actually implemented in a number of working systems, such as Isis and Horus. Below we present a brief overview of the previous work.

Isis ABCAST Algorithm

The Isis system is one of the pioneering protocols that support atomic multicast. Isis is described in K. P. Birman et al., *Lightweight Causal and Atomic Group Multicast*, ACM TRANSACTIONS ON COMPUTER SYS., August 1991, and in K. P. Birman & T. Joseph, *Reliable Communication in the Presence of Failures*, ACM TRANSACTIONS ON COMPUTER SYS., February 1987. Both above-mentioned articles are hereby incorporated by reference as if fully set forth herein.

The Isis ABCAST primitive achieves atomicity and total ordering based on a three-way commit protocol. To send a message from a client/sender, the following steps are performed:

1. A sender transmits the message to all of its destinations.
2. Upon receipt of the message, each recipient assigns it a priority number larger than the priority of any message received but not yet delivered; the recipient then informs the sender of the priority it assigned to the message.
3. The sender collects responses from the recipients that remain operational, computes the maximum value of all the priorities it had received, and sends this value back to all the recipients.
4. The recipients change priority of the message to the value received from the sender; they can then deliver messages in order of increasing priority.

A number of factors contribute to the poor scalability of Isis. First, to send a message, the sender has to block until the communication completes. During this period, no other message can be sent. This means that the performance of the entire multicast group is limited by the slowest receiver.

Second, explicit knowledge of group membership is required to ensure reliability. The management of group membership is expensive. Moreover, whenever the group membership changes, the entire group has to block until every member has installed the new view of the group membership. This is undesirable in many cases. For example, in the router context mentioned above, new router controllers are added when the system load is high. Blocking the entire controller group can easily cause disastrous network congestion in this case.

Finally, the overhead for sending a message is relatively high. For each multicast message, three communication steps are required to ensure the proper delivery of the multicast message, even if the communication channel is perfect and no group member fails. Furthermore, an overhead of 2n total messages is involved in the best case, where n is the group size.

For all these reasons, the ABCAST algorithm typically cannot scale to more than 100 members.

Sequencer-Site Algorithms

This class of algorithms is described in, inter alia, M. F. Kaashoek et al, *An Efficient Reliable Broadcast Protocol*, OPERATING SYS. REV., October 1989, hereby incorporated by reference as if fully set forth herein. Sequencer-Site algorithms achieve total ordering by using an elected process—a sequencer—responsible for assigning sequence numbers to all multicast messages and then multicasting the messages to the entire group. This algorithm requires a single communication step in the optimal case where the sequencer is also the source of the message, and two steps in all other cases. Because of the high load on the sequencer, the algorithm is considered non-scalable even for medium size systems.

Rotating-Token Algorithms

These algorithms are described in the following sources: (1) Y. Amir et al., *The Totem Single-Ring Ordering and Membership Protocol*, ACM TRANSACTIONS ON COMPUTERS SYS., November 1995; (2) J. M. Chang and N. Maxemchuck, *Reliable Broadcast Protocols*, ACM TRANSACTIONS ON COMPUTER SYS., August 1984; (3) Robbert van Renesse et al., *Horus: A Flexible Group Communications System*, COMM. OF ACM, April 1996; and (4) L. E. Moser et al., *Extended Virtual Synchrony*, IEEE 14th Int'l Conf. on Distributed Computing Sys., June 1994. These articles are hereby incorporated by reference as if fully set forth herein.

The algorithms in this class are similar to the sequencer-site algorithms, but they rotate the role of the sequencer, i.e., pass (1)he token, among several processes. Thus, before any message can be sent, the sender has to acquire a "token." The token-holder then places a sequence number on each message it multicasts, and messages that arrive out of sequence are delayed until they can be delivered in order. The rotating-token algorithm alone can not guarantee message atomicity. It is usually combined with knowledge of group membership to achieve atomic multicast.

Rotating-token algorithms provide load balancing and avoid network contention when shared links are used, as is the case, for instance, in Ethernet-based LANs. Unfortunately, token management usually involves substantial overhead. In addition, in the worst delay case, a client-sender may need to wait for a complete rotation of the token before it can send any messages. This can lead to excessive latency.

Symmetric Algorithms

These algorithms are based on Lamport's total order algorithm, described in L. Lamport, *Time, Clocks, and the Ordering of Events in a Distributed System*, COMM. OF ACM, July 1978. See also L. Rodrigues et al., *Totally Ordered Multicast in Large-Scale Systems*, IEEE 16TH INT'L CONF. DISTRIBUTED COMPUTING SYS ., May 1996. The Lamport and Rodrigues articles are hereby incorporated by reference as if fully set forth herein.

In this scheme, data messages are delivered according to the order defined by the timestamps assigned at multicast time. In order to be live, algorithms in this class require correct processes to multicast messages periodically. Alternatively, an additional communication step is required. Total order can be established in a single communication step when all processes broadcast simultaneously, and in two steps in all other cases. Unfortunately, in such symmetric algorithms, all group members are involved in the communication. This means that the entire system has to cater to the slowest member.

Chandra and Toueg's Algorithm

This algorithm requires two steps: (1) reliably broadcasting a message; followed by (2) execution of a consensus. See T. D. Chandra & S. Toueg, *Unreliable Failure Detectors for Reliable Distributed Systems*, J. OF ACM, March 1996. This article is hereby incorporated by reference as if fully set forth herein.

The consensus algorithm is based on a failure detector ($\lozenge S$) that requires three communication steps; thus, in the best case, a total of four communication steps are required to run the total order broadcast algorithm. The Chandra-Toueg algorithm requires $(n-1)^2$ messages for the first step (reliable broadcast), and $(2(n-1)+(n-1)^2)$ messages for the second step (consensus execution), for a total of $(2(n-1)^2+2(n-1))$ messages, where n is the multicast group size. Clearly, the second order group size dependence scales poorly.

OBJECT OF THE INVENTION

Accordingly, the object of the present invention is to provide a robust atomic multicast communication protocol with good scaling properties.

SUMMARY OF THE INVENTION

In order to accomplish the aforementioned objects of the invention, the inventive steps for processing a data message sent to members of a multicast group include:
1. Each data server that receives the data message requests the sequencer to assign a sequence number to the data message;
2. After the sequencer receives a predetermined number of requests to assign a sequence number to the data message, the sequencer assigns the next sequence number to the message and submits this sequence number to commit servers;
3. After a commit server receives the assigned sequence number, it sends to the sequencer an acknowledgment of receipt of the sequence number;
4. Once the sequencer has received a predetermined number of acknowledgments of receipt of the sequence number assigned, it commits, i.e., permanently associates, the assigned sequence number to the data message and informs the entire group about the commitment.

DETAILED DESCRIPTION OF THE INVENTION

Figure 1B:
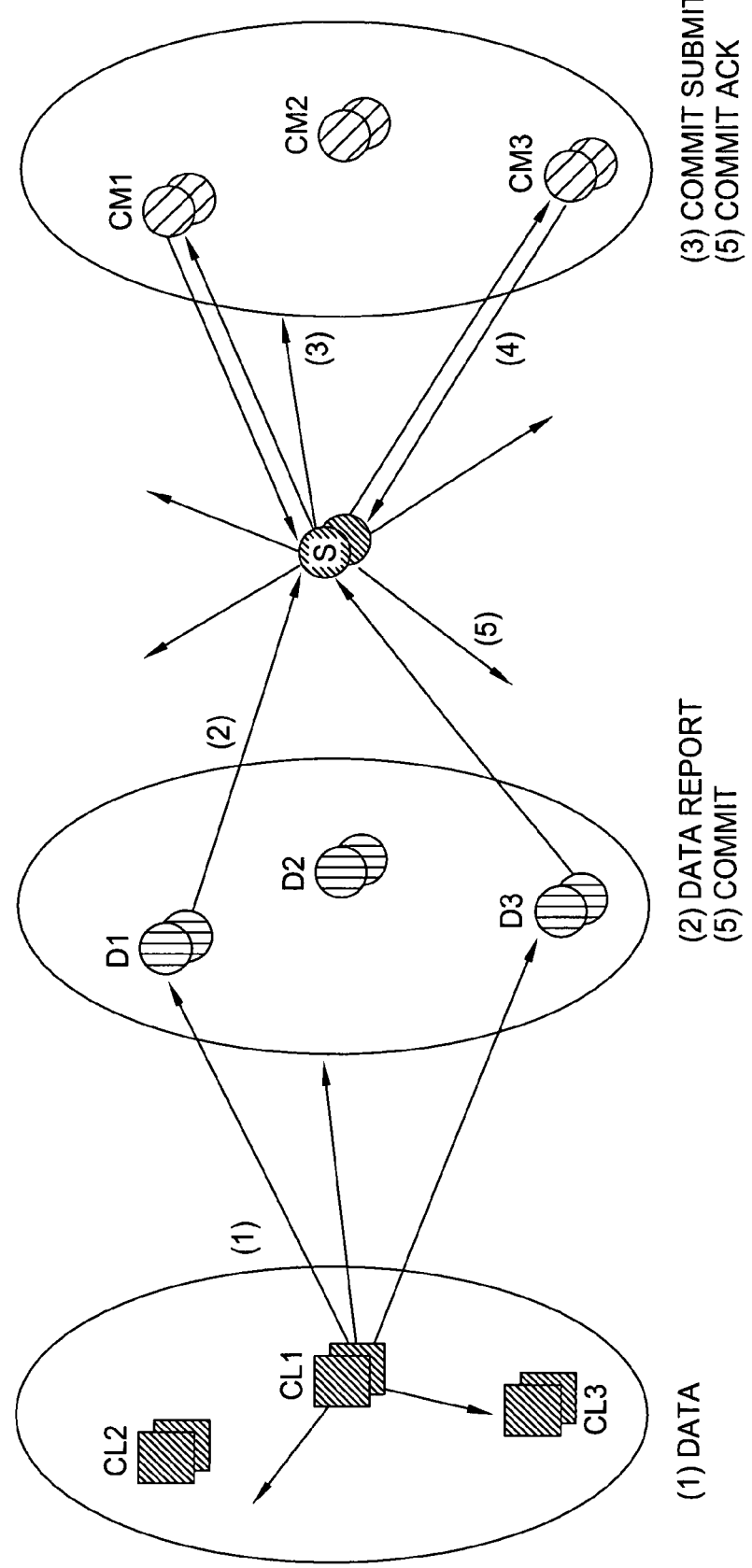
FIGS. 1(*a*) and 1(*b*) illustrate one implementation of the SAM protocol.

In the remainder of this specification, we assume that the underlying communication layer provides support for asynchronous, unreliable multicast communication. When multicast is not available, it can be easily simulated with a series of unicast transmissions. Although the underlying communication need not be reliable, the protocol can benefit from any technique that increases reliability, such as forward error correction (FEC). Similarly, any multicast congestion control technique can be easily incorporated in the system. We do not, however, consider multicast congestion control in this work.

SAM supports an open multicast group model. In other words, any process can send messages to the multicast group. This is different from some systems, where only the members of the group are allowed to send messages to the group.

The following discussion also assumes that each process in the system has a unique process identifier (PID), and that each message sent to the group has a unique message ID (MID), but these qualities are not strictly necessary.

In SAM architecture, each process takes one of the following five different roles:

Sequencer. At any time, there is a single sequencer in the system. The sequencer serializes data messages sent to the group by assigning a unique sequence number to each message. The sequencer assigns sequence numbers sequentially, the increasing (progressing) order of sequence numbers forming total ordering over all messages sent to the group. As long as all members of the multicast group deliver the messages based on their sequence numbers, they will deliver messages in the same order.

Commit Server. Commit servers store the ordering information for each message, i.e., the <message ID, sequence number> pair. Moreover, if the sequencer goes down, one of the commit servers will take over as the new sequencer.

Data Server. Data servers store the data messages sent to the group. Their main function is to support persistent message delivery, i.e., providing old data messages to the group members. This capability is important when a new member joins the group, and when re-delivery of a message is required after the original message delivery to an existing member fails.

Checkpoint Server. Checkpoint servers consolidate messages.

Client. All other members of the group are clients.

Note that these are logical entities only. They are introduced for clarity of description. Different types of processes need not be physically separate—a single process can perform different functions.

Clients may be distributed over a wide area. On the other hand, it is preferable that all servers—the sequencer, commit servers, data servers, and checkpoint servers—be located on the same LAN/SAN. We can easily achieve this by using a cluster for the servers.

We further assume four multicast channels in the system: one channel (GLOBALCHAN) for the entire group, another channel (DATACHAN) for all data servers, the third channel (COMMITCHAN) for all commit servers, and the fourth channel (CHKPNTCHAN) for all checkpoint servers. Again, these logically different channels need not be physically distinct. Since we assume that all servers are on the same LAN/SAN, we can have a single multicast channel for all servers, rather than having multiple server channels.

To improve the basic five step method described immediately above, we use a receiver-driven, negative acknowledgment (NACK) based approach.

Clients are required to deliver messages to upper layer applications in order of increasing sequence numbers. Since sequence numbers are assigned sequentially, any gap in the sequence numbers indicates that some messages are missing. The sequencer keeps assigning new sequence numbers and informing the entire group of these numbers. Moreover, the sequencer periodically sends out gossip (heartbeat) messages that contain the largest sequence number in the system. In this way, the clients can easily detect non receipt of data and Commit messages. (Unless otherwise indicated, we do not distinguish between a data message that has not been received by a client and a received data message without a corresponding Commit message; for convenience, we generally refer to such messages as "missing.")

Figure 2:
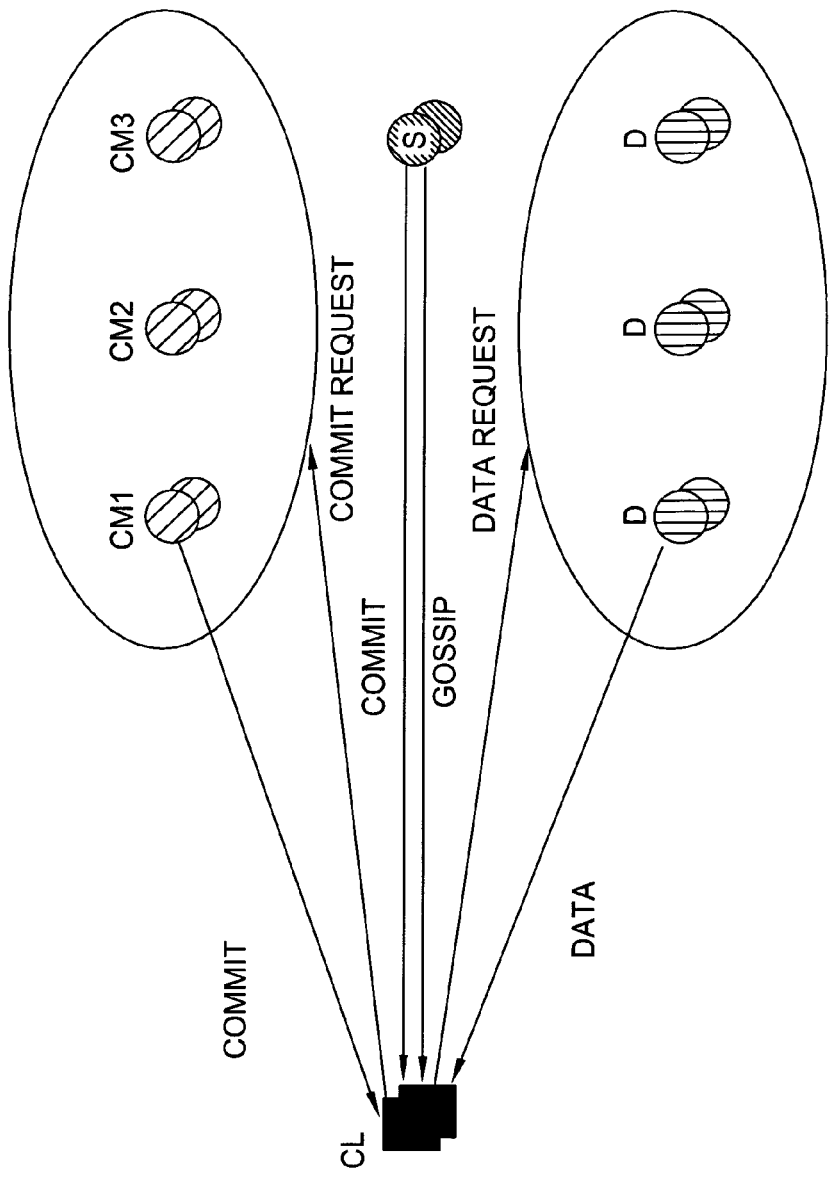
FIG. 2 shows delivery of a data message in SAM.

Once a client detects that a message is missing, he can get this message through the following two step procedure, as illustrated in FIG. 2:

1. If the message ID is unknown, the client first sends a query to one of the commit servers to find out the message ID corresponding to the missing sequence number; otherwise, go to the next step.

2. After getting the message ID, the client first checks whether this data message has already been received; if so, the client knows that the message has been committed to the missing sequence number; otherwise, the client sends another query to one of the data servers to retrieve the data message with the corresponding message ID.

Here we have chosen to decouple the query for the message ID from the query for the actual data message. Therefore, the client has to do two queries in the worst case. Alternatively, we can have the client do only one query and have the servers send the data message corresponding to the missing sequence number to the client directly. The problem with the second approach is that it is possible that the client has already received the data message; the only thing missing is the sequencer's Commit message containing the sequence number of the data message. In this case, it is wasteful to retransmit the message. When the group is large, such unnecessary overhead becomes significant. On the other hand, if the client misses multiple messages, the overhead of extra queries for the message ID can be amortized over the multiple missing messages by including multiple queries in a single message.

For a protocol using a NACK-based approach to be truly reliable, a copy of each multicast data packet must be stored somewhere within the network. In SAM, senders no longer need to do this—the data servers store all the data messages sent to the group. The storage problem, however, still exists—it has merely shifted from the senders to the data servers. SAM solves the problem by supporting message consolidation.

Many real world state synchronization problems resemble updating a table in an asynchronous, message-passing system. More specifically, the system state can be modeled as content of a table, with each process-group member keeping a local copy of the table; the data messages sent to the group operate on the table, querying or modifying the table's content. The goal is to maintain consistency among all local copies of the table. This is exactly the case in the router context we mentioned before.

If the table-updating paradigm represents the state synchronization problem of the multicast group, the data servers need to store only the cumulative state of the system, rather than the entire history of operations on the table. Therefore, the data messages can be consolidated by checkpointing the system state periodically, for example every 50,000 messages with consecutive sequence numbers. We define the sequence number of a checkpoint as the maximum sequence number among all messages consolidated by the checkpoint. To synchronize its upper level application, a new client, or a client that became asynchronous, no longer needs to deliver all the data messages that have been sent to the multicast group; the client needs to retrieve and deliver only the latest checkpoint and all committed but not checkpointed data messages with sequence numbers larger than the sequence number of the checkpoint. All checkpointed data messages can thus be garbage collected. Moreover, no checkpoint server needs to be blocked during synchronization because the client requests each block of the checkpoint separately, though such logically separate requests may be grouped in the same query message.

The task of checkpointing the system state is performed by the checkpoint servers. A checkpoint server is just a client with some special upper level checkpointing application. Just like any other client, a checkpoint server needs to deliver a checkpoint and all the messages with higher sequence numbers to its upper layer applications. Here, the checkpointing application provides the following functionality specific to checkpointing:

1. Make checkpoints periodically; that is, make a checkpoint every predetermined number of messages; the checkpoint period may be fixed and agreed upon by all such checkpoint applications; alternatively, the checkpoint period may be dynamic, determined by some consensus protocol.

2. Periodically send Checkpoint Reports, with checkpoint information, to the sequencer, so that the sequencer can inform the entire group about the latest checkpoint; checkpoint information includes the corresponding sequence number and the size of each checkpoint; with this information, a client can request a specific block of a specific checkpoint from a checkpoint server.

3. Provide checkpoint data when requested.

To ensure reliability, the sequencer advertises information only about checkpoints replicated with sufficient redundancy, according to the user's requirements. That is, the sequencer advertises only those checkpoints that have been reported by a predetermined number of checkpoint servers.

Before explaining our garbage collection algorithm, let us first define the concept of "logical timestamp" of a data message. The logical timestamp is defined as the largest sequence number that the sender-client knew about at the time when the message was sent for the first time. This concept therefore may not apply to data messages generated outside the multicast group. Every retransmitted data message bears the logical timestamp of the original message. Thus, logical timestamp indicates the sender's view of the current system state.

To improve garbage collection, we also introduce the concept of "maximum logical lifetime". The sequencer assigns sequence numbers only to those messages whose logical timestamp is greater than [maximum sequence number assigned by the sequencer—maximum logical lifetime]. That is, any data message becomes garbage if it can not be assigned a sequence number within the next [maximum logical lifetime] sequence numbers assigned by the sequencer.

In SAM, any information can be garbage collected if either of the following two conditions holds:

1. The information has been checkpointed already; thus, if the logical timestamp of a data message is older than the latest system checkpoint number, the data message has been checkpointed and hence can be garbage collected.

2. The information is too old to be useful; for example, a data server can stop requesting the sequencer to assign a sequence number to a data message if the logical timestamp of the data message becomes less than [the largest sequencer number the data server has ever seen—maximum logical lifetime]; this is because the sequencer will not assign a sequence number to the message if it has not done so already.

It may be advisable to keep the information longer than strictly necessary, in order to allow a client that is missing a data message to retrieve it from a data server directly, rather than resort to the two step synchronization process.

Recovery from machine crashes is easy with SAM. Because the system generally has redundant data, commit, and checkpoint servers, no information is lost when one of the servers crashes. If a client crashes, it can recover by synchronizing itself, as described above.

Recovery from sequencer failure, however, requires a different procedure. First, a new sequencer is selected from among the commit servers. This can be achieved using any well-known distributed leader election algorithm.

Second, the new sequencer finds out the maximum sequence number in the system. The preferred way of achieving this is by using stable storage. Information stored in stable storage must be unaffected by sequencer failure. Whenever the sequencer assigns a new sequence number, it always first writes the maximum sequence number to the stable storage. In this way, the newly elected sequencer can immediately find out the maximum sequence number by reading the stable storage. Note that we only need to store the maximum sequence number in stable storage; hence, a very small amount of stable storage is required. Alternatively, the new sequencer can query all commit servers for the highest committed sequence number.

Third, the new sequencer gets the history for the last [maximum logical lifetime] assignments of sequence numbers. Knowledge of the history is necessary to ensure that the sequencer does not assign sequence numbers to the messages that already have sequence numbers assigned to them. This does not mean that the newly elected sequencer cannot assign new sequence numbers until it obtains the entire requisite history; the new sequencer can assign a sequence number to any data packet as long as it knows that this has not been done before; therefore, if the assignments of all sequence numbers greater than the logical timestamp of the data message are known, the sequencer can assign a sequence number to it.

SAM is a robust algorithm providing reliable data message delivery. It can be designed to withstand numerous failures. As with any fault-tolerant system, this is achieved through data replication. Here, we give a brief summary of SAM's data replication provisions discussed above in various contexts.

Given a common redundancy requirement k, the data replication algorithm is as follows:

1. The sequencer assigns sequence numbers only to messages that have been reported by at least k different data servers. This ensures that any message that has been assigned a sequence number is replicated at least k times.

2. Before the sequencer informs the entire group about commitment of a sequence number to a specific message, the sequencer must first receive acknowledgments from at least k different commit servers. This ensures that the sequence number information is replicated at least k times.

3. The sequencer advertises checkpoint information only about checkpoints reported by at least k checkpoint servers. This ensures that every checkpoint known to the entire group is replicated at least k times.

By replicating information at least k times, SAM can withstand up to (k−1) failures among data servers, checkpoint servers, and commit servers, respectively. And since we support persistent message delivery, SAM can withstand any number of failures among clients. The redundancy requirement of course need not be the same for the data, commit, and checkpoint servers.

With SAM, the sequencer needs to wait for messages from only k servers each time, instead of waiting for messages from all group members, as in Isis and Horus. The number of servers is generally very small compared to the number of clients. And it is possible to make the servers highly reliable, for example, by using special hardware. So k can be made very small. Consequently, we no longer have to cater to the slowest member of the group, but only wait for k responses from k servers located on the same LAN/SAN.

The actual reliability can be much higher than is implied by server redundancy and data replication. This is because we can make the communication channels among servers—DATACHAN, COMMITCHAN, and CHKPNTCHAN—also highly reliable. Such highly reliable servers connected by highly reliable communication channels can drastically improve performance when the network suffers from packet loss, or when the group membership is highly dynamic. Furthermore, since clients generally request data from only one of the servers, multiple servers can work in parallel, making the system even more scalable. This is not the case in Isis and Horus, where increasing group size impairs performance.

As a final remark, note that knowledge of group membership is almost unnecessary in SAM. Of course, such knowledge is needed at lower layers to provide multicast services; but the cost is relatively low and working protocols such as IGMP manage group membership efficiently.

While the features of the invention have been described and illustrated with some specificity, it will be understood by those skilled in the art that changes in the above description or illustration may be made with respect to form or detail without departing from the spirit and scope of the invention.

Having thus described the invention:

We claim:

1. A method for multicasting data messages to members of a multicast group, the multicast group comprising a sequencer, one or more clients, one or more data servers, and one or more commit servers, the method comprising the steps of:

transmitting a first data message to the members of the multicast group;

each data server that receives the first data message requesting the sequencer to assign a first sequence number to the first data message, the first sequence number being from a sequence of numbers allocated to the data messages, said first sequence number following all sequence numbers assigned prior to assignment of the first sequence number;

assigning the first sequence number to the first data message, in response to the sequencer receiving a first quantity of the requests to assign a first sequence number to the first data message said first quantity of requests being other than a majority of requests from the data servers;

notifying the commit servers of the assignment of the first sequence number to the first data message;

each of the commit servers sending to the sequencer an acknowledgment of the notification of the assignment of the first sequence number to the first data message, in response to being notified of the assignment of the first sequence number to the first data message;

committing the first sequence number to the first data message, in response to the sequencer receiving a second quantity of the acknowledgments of the notification of the assignment of the first sequence number to the first data message; and informing the members of the multicast group of the commitment of the first sequence number to the first data message.

2. A method according to claim 1, wherein said step of each data server that receives the first data message requesting the sequencer to assign a first sequence number to the first data message includes the step of sending, from said each data server that receives the first data message to the sequencer, a data report message identifying the first data message;

said step of notifying the commit servers of the assignment of the first sequence number includes the step of submitting to the commit servers a commit submit message identifying the first data message;

said step of sending to the sequencer an acknowledgment of the notification of the assignment of the first sequence number includes the step of sending to the sequencer a commit acknowledge message identifying the first data message; and said step of informing the members of the multicast group of the commitment of the first sequence number includes the step of sending a commit message identifying the first data message to the members of the multicast group.

3. A method according to claim 2, further comprising the step of transmitting a second data message to the members of the multicast group;

wherein said step of sending, from said each data server that receives the first data message to the sequencer, a data report message identifying the first data message further includes the step of a first data server sending a first data report message identifying the first data message to the sequencer after said first data server receives the second data message, said first data report message also identifying the second data message.

4. A method according to claim 2, further comprising the steps of:

transmitting a second data message to the members of the multicast group;

each data server that receives the second data message requesting the sequencer to assign a second sequence number, the second sequence number being from the sequence of numbers allocated to the data messages, said second sequence number following all sequence numbers assigned prior to assignment of the second sequence number, to the second data message, said step of each data server that receives the second data message requesting the sequencer to assign a second sequence number to the second data message, includes the step of sending from said each data server that receives the second data message to the sequencer a data report message identifying the second data message;

assigning the second sequence number to the second data message, in response to the sequencer receiving a third quantity of the requests to assign a second sequence number to the second data message;

wherein said step of notifying the commit servers of the assignment of the first sequence number further includes the step of notifying the commit servers of the assignment of the second sequence number, said commit submit message identifying the first data message also identifying the second data message.

5. A method according to claim 2, wherein the members of the multicast group deliver the data messages to their respective upper layer applications in order of progressing sequence numbers, further including the step of using a receiver driven, negative acknowledgment-based approach to improve reliability of delivery of the data messages.

6. A method as in any one of claims 1–5, wherein said data servers store said data messages transmitted to the multicast group, the multicast group further comprising checkpoint servers, the method further including the steps of:

step for message consolidation;

step for garbage collection; and step for storing said first sequence number in stable storage.

7. A method for processing data messages multicast to members of a multicast group, the multicast group comprising a sequencer, one or more clients, one or more data servers, and one or more commit servers, the method comprising the steps of:

each data server that receives said each data message requesting the sequencer to assign a sequence number, from a sequence of numbers allocated to the data messages, to said each data message, in response to receiving each data message;

assigning a sequence number following all sequence numbers assigned prior to assignment of the sequence number to said each data message, in response to the sequencer receiving a first quantity of requests to assign a sequence number to said each data message said first quantity of requests being other than a majority of requests from the data servers;

notifying the commit servers of each assignment, each notification identifying said each assignment by said each data message and the sequence number assigned to said each data message;

each of the commit servers sending to the sequencer an acknowledgment of said each notification, in response to being notified of said each assignment, said acknowledgment identifying said each data message;

committing said each assignment, in response to the sequencer receiving a second quantity of the acknowledgments identifying said each data message; and informing the members of the multicast group of each commitment.

8. A method according to claim 7, wherein the members of the multicast group deliver the data messages to their respective upper layer applications in order of progressing sequence numbers;

said data servers store said data messages transmitted to the multicast group;

further including the step of using a receiver driven, negative acknowledgment-based approach to improve reliability of delivery of the data messages.

9. A method according to claim 8, wherein said each data message is associated with a unique message ID and is identifiable from its associated message ID, the step of using further includes the steps of:

each member of the multicast group identifying gaps in a progression of sequence numbers known by said each member of the multicast group to have been committed to data messages received by said each member of the multicast group;

if said each member of the multicast group does not know a first message ID, said first message ID being associated with a first data message, a first sequence number within one of said gaps having been previously committed to said first data message, said each member of the multicast group querying one of said commit servers to obtain said first message ID; and if said each member of the multicast group has not received said first data message, querying one of said data servers to retrieve said first data message.

10. A method according to claim 8, wherein said each data message is associated with a unique message ID and is identifiable from its associated message ID, the step of using further includes the steps of:

each member of the multicast group identifying gaps in a progression of sequence numbers known by said each member of the multicast group to have been committed to data messages received by said each member of the multicast group;

said each member of the multicast group querying one of said data servers to retrieve said first data message.

11. A method according to claim 10, further comprising the step of said sequencer periodically generating and sending heartbeat messages to the members of the multicast group, each said heartbeat message containing an associated largest sequence number, said associated largest sequence number being the last sequence number committed at a time substantially equal to a time said heartbeat message is generated.

12. A method according to claim 8, further comprising a step of periodic message consolidation.

13. A method according to claim 8, wherein the multicast group further comprises one or more checkpoint servers, the method further comprising the step of performing periodic message consolidation by said checkpoint servers at message intervals determined through a common consensus protocol, each message consolidation producing a checkpoint associated with said each message consolidation, said checkpoint associated with said each message consolidation corresponding to a terminal data message, said checkpoint associated with said each message consolidation containing checkpoint information, the checkpoint information being sufficient for a first upper layer application of said upper layer applications to reconstruct a cumulative system state said first upper layer application would attain upon receiving said terminal message and all said data messages that preceded said terminal message.

14. A method according to claim 13, further comprising the step of said checkpoint servers periodically generating and sending checkpoint reports to said sequencer, each checkpoint report corresponding to latest checkpoint at the time said each checkpoint report is generated, said each Checkpoint Report identifying a sequence number of its corresponding terminal data message, said each checkpoint report carrying size data of the latest checkpoint.

15. A method according to claim 14, further comprising step for synchronizing a first asynchronous upper layer process of a first asynchronous member of the multicast group with other members of the multicast group, said first asynchronous member not being said sequencer or one of said data or commit servers.

16. A method according to claim 14, further comprising the step of synchronizing a first asynchronous upper layer process of a first asynchronous member of the multicast group with other members of the multicast group, said first asynchronous member not being said sequencer or one of said data or commit servers, said synchronizing step including the steps of:

said first asynchronous member retrieving a first checkpoint from said checkpoint servers;

said first asynchronous process retrieving all committed data messages following terminal data message corresponding to the first checkpoint;

delivering said first checkpoint to said first asynchronous upper level process;

delivering said all committed data messages following the terminal data message corresponding to the first checkpoint to said first asynchronous upper level process; and said first asynchronous upper level process processing said delivered checkpoint and said delivered data messages to achieve a system state identical to system states of other members of the multicast group.

17. A method according to claim 8, wherein said each data message bears a corresponding logical timestamp, said logical timestamp including a most recent sequence number known to original sender of said each data message when said each data message was first sent.

18. A method according to claim 16, wherein said each data message bears a corresponding logical timestamp, said logical timestamp including a most recent sequence number known to original sender of said each data message when said each data message was first sent.

19. A method according to claim 18, further comprising the step of:

the data servers deleting said stored messages that have logical checkpoints older by a maximum logical lifetime number at the time of deletion than a most recent sequence number known at the time of deletion.

20. A method according to claim 14, further comprising the step of:

said data servers deleting the stored data messages that are older than the latest checkpoint.

21. A method according to claim 16, wherein the multicast group further includes stable storage writeable by said sequencer, said method further comprising the step of said sequencer storing in said stable storage said assigned sequence number before said step of notifying the commit servers.

22. A method according to claim 8, wherein the multicast group further includes stable storage writeable by said sequencer, said method further comprising the step of said sequencer storing in said stable storage said assigned sequence number before said step of notifying the commit servers.

23. A method for multicasting data messages to members of a multicast group comprising the steps of:
  transmitting a data message to the members of the multicast group;
  requesting assignment of a sequence number to the data message;
  assigning the sequence number to the data message in response to a non-majority number of requests from the data servers;
  sending notification of the assignment of the sequence number to the data message;
  sending an acknowledgment of the notification of the assignment of the sequence number to the data message;
  committing the sequence number to the data message; and
  informing the members of the multicast group of the commitment of the sequence number to the data message.

24. A method according to claim 23, wherein
  said step of requesting includes the step of sending a data report message identifying the data message;
  said step of sending notification of the assignment of the sequence number includes the step of submitting a commit submit message identifying the data message;
  said step of sending an acknowledgment of the notification of the assignment of the sequence number includes the step of sending a commit acknowledge message identifying the data message; and
  said step of informing the members of the multicast group of the commitment of the sequence number includes the step of sending a commit message identifying the data message to the members of the multicast group.

25. A method according to claim 24 wherein the data message is a first data message, the sequence number is a first sequence number and the method, further comprises the steps of:
  transmitting a second data message to the members of the multicast group;
  requesting assignment of a second sequence number;
  assigning the second sequence number to the second data message;
  wherein said step of sending notification of the assignment of the first sequence number further includes the step of sending notification of the assignment of the second sequence number, said commit submit message identifying the first data message also identifying the second data message.

26. A method according to claim 23 wherein the step of assigning the sequence number to the data message is done in response to receiving a first quantity of the requests to assign a sequence number to the data message.

27. A method according to claim 23 wherein the step of sending an acknowledgment of notification of the assignment of the sequence number is performed in response to being notified of the assignment of the sequence number to the data message.

28. A method according to claim 23 wherein the step of committing the sequence number to the data message is performed in response receiving a quantity of the acknowledgments of the notification of the assignment of the sequence number to the data message.

* * * * *